UNITED STATES PATENT OFFICE.

JACOB LAMPLUGH, OF PHILADELPHIA, PENNSYLVANIA.

IMPROVEMENT IN COMPOSITIONS FOR PRESERVING LEATHER.

Specification forming part of Letters Patent No. 146,080, dated December 30, 1873; application filed July 5, 1873.

*To all whom it may concern:*

Be it known that I, JACOB LAMPLUGH, of Philadelphia, Pennsylvania, have invented an Improved Leather-Preserver, of which the following is a specification:

The object of my invention is a composition for softening and preserving leather, consisting of a mixture of burnt tallow, caoutchouc, and bees-wax.

I prefer to use the several ingredients in about the following proportions: Beef and mutton tallow, mixed, fifty pounds; South American gum, (caoutchouc,) five pounds; bees-wax, one and a half pound.

The tallow is first rendered, in order to separate all impurities from the same, and is then burned until black, after which the gum is melted in a separate vessel with a small quantity of tallow, and is then added to the burnt tallow while both are still hot, the mixture being boiled for about an hour and a half, when it is taken off the fire, and cooled until just warm enough to melt the bees-wax, which is added and well stirred in.

The leather to be softened and preserved should be thoroughly saturated with the composition, and should be perfectly dry when the latter is applied.

The most essential feature of my invention is the burning of the tallow, as this prevents the grease from becoming rancid, and greatly increases the leather-preserving qualities of the composition. The ingredients specified are all that are absolutely essential; but others may be added without departing from my invention.

I claim as my invention—

A leather-preserving composition consisting of burnt tallow, caoutchouc, and bees-wax, with or without other ingredients.

In testimony whereof I have signed my name to this specification in the presence of two subscribing witnesses.

JACOB LAMPLUGH.

Witnesses:
 WM. A. STEEL,
 HARRY SMITH.